REISSUED AS NO. 16690 JULY 26 1927
June 16, 1925.
J. M. EVERETT
1,542,683
TRANSPLANTING POT
Filed Feb. 2, 1924
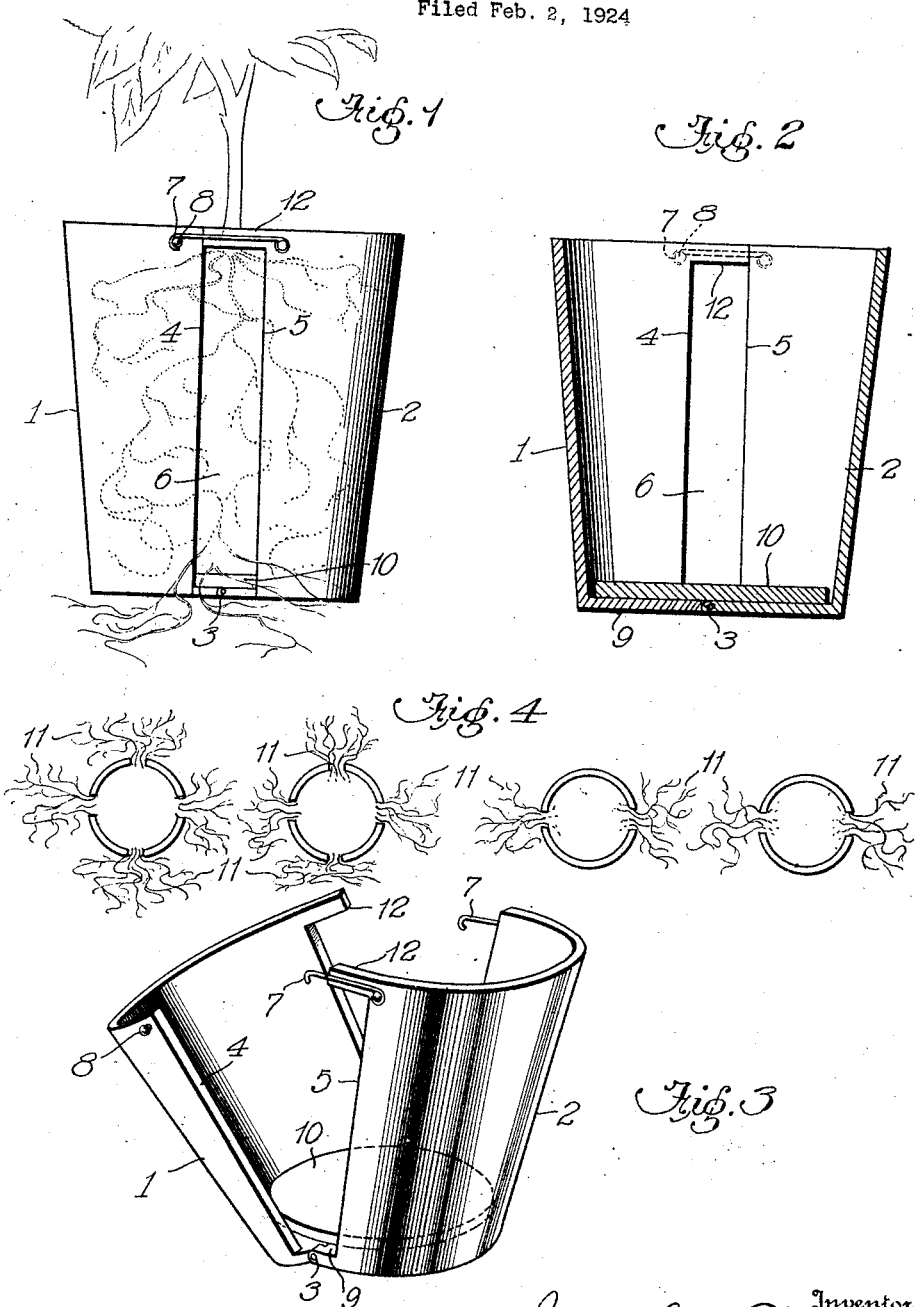
Inventor
James M. Everett
By [signature]
Attorney Patented June 16, 1925.

1,542,683

UNITED STATES PATENT OFFICE.

JAMES M. EVERETT, OF LAKE WALES, FLORIDA, ASSIGNOR OF ONE-HALF TO CHARLES M. HUNT, OF LAKE WALES, FLORIDA.

TRANSPLANTING POT.

Application filed February 2, 1924. Serial No. 690,233.

*To all whom it may concern:*

Be it known that I, JAMES M. EVERETT, a citizen of the United States, residing at Lake Wales, in the county of Polk and State of Florida, have invented certain new and useful Improvements in Transplanting Pots, of which the following is a specification.

This invention relates to transplanting pots for seeds, plants, shrubbery, trees and the like. One of the great problems of the nurseryman is the transplanting of plants and the like from his nursery to the ultimate position of the plant without injuring the "tap" root because the tap root shoots downward very deep and it has been found practically impossible to transplant a plant without injuring this tap root. As is well known, injury to the tap root retards for a considerable period the growth of the plant after it is transplanted, and in many cases results in the death of the plant.

The object of my invention is to control the direction of growth of the tap root and at the same time leave it free to make a natural growth, and also to control the growth of the other roots of the plant so that they will so intermingle with the ball of dirt that when the plant is lifted these other roots will hold the ball of dirt intact.

My invention consists of a transplanting pot so constructed that the direction of growth of the tap root is controlled and at the same time the other roots of the plant are controlled and intermingled with the earth to form an earth ball and hold it intact in the transplanting of the plant.

In the drawings:

Figure 1 is a vertical transverse section of my improved transplanting pot with a plant illustrated as being positioned therein.

Figure 2 is a vertical transverse section of the pot at right angles to the sectional view in Figure 1, the plant being removed.

Figure 3 is a perspective view of my improved transplanting pot with the pot in collapsed position.

Figure 4 is a top plan view of a plant row showing my improved pots in position and the tap roots, the top of the plant being omitted.

While I have, for the purposes of illustrating my invention, shown in the drawings a transplanting pot composed primarily of two hinged members, it will, of course, be understood that there may be any number of members that may be desired.

As shown in the drawings, the pot comprises two members, 1 and 2, which are hinged together at the bottom as at 3. These members, or side walls, 1 and 2, have vertical edges, 4 and 5, which extend vertically throughout the length of the member from the top edge to the bottom edge thereof and, when the pot is assembled in upright position, are spaced from each other a material distance from the top to the bottom edges thereof, said spaces being indicated by the reference numeral 6. At the top of one of the members I provide a fastening 7 which extends across the spaces 6 and engages a catch 8 on the other member whereby the parts of the pot are held in assembled position.

It will be noted that the bottom 9 of the pot is solid and that I provide a removable bottom 10 which fits snugly at the bottom of the pot and thereby seals the bottom of the pot and the joint of the hinge 3 to prevent the dirt from engaging with the bottom of the pot, and also to prevent the roots of the plant passing through the bottom of the pot.

My improved transplanting pot, as above stated, is adapted to receive seeds, plants and the like with the necessary soil, and the tap root 11 of the plant is prevented from growing outward through the bottom of the pot, and in accordance with the nature of plants this tap root seeks an outlet and naturally grows through the spaces 6 as indicated in Figure 1 whereby the tap root extends laterally from the plant and develops in the earth a distance from the surface of the earth equal to the height of the pot, the pot being buried flush with the surface of the earth.

It will also be noted from Figure 1 that the other roots of the plant are insulated from the earth surrounding the pot and are confined within the pot and intermingle with the earth in the pot to such an extent that they hold the ball of earth in the pot together when the plant is removed from the pot to be replaced in its permanent growing position.

In Figure 4 I have illustrated a row of plants diagrammatically. In the right hand plants I have illustrated the tap root extending from each side of the pot in the line of the row which is desirable in some plants because this permits cultivation between the rows without danger of injuring the tap roots. In the left hand portion of Figure 4 I have illustrated the tap roots as extending from four sides of the pot, two of the tap roots extending in the line of the row, the other two tap roots extending transversely of the row.

My improved transplanting pot has proven very efficient in my business inasmuch as I have not lost, in transplanting, a single plant grown in my transplanting pot.

My improved pot is made from imperforate material, the only openings in the pot being the top and the spaces 6 whereby the plant root is insulated from the earth surrounding the pot with the expansion at the spaces 6. I provide positive spacing members 12 on the side members of the pot which are adapted to engage the vertical edge of the other member of the pot whereby pressure of the earth around the pot is prevented from decreasing the predetermined size of the spaces 6.

It will be understood that changes may be made in the details of construction of my invention within the scope of the appended claims.

What I claim is:

1. A transplanting pot including imperforate side wall sections, the adjacent vertical edges of which are spaced from each other throughout the height of the pot, a hinge connecting the sections at the bottom and means sealing the bottom of the pot.

2. A transplanting pot including imperforate side wall sections, the adjacent vertical edges of which are spaced from each other throughout the height of the pot, a hinge connecting the sections together at the bottom of the pot, and a false bottom in the bottom of the pot.

3. A transplanting pot including imperforate side wall sections, the adjacent vertical edges of which are spaced from each other throughout the height of the pot, a hinge connecting the sections together at the bottom, a false bottom in the bottom of the pot sealing the bottom of the pot, and fastening means at the top of the sections holding the sections together at the top.

In testimony whereof I affix my signature.

JAMES M. EVERETT.